(12) United States Patent
Kawasoe et al.

(10) Patent No.: US 10,334,430 B2
(45) Date of Patent: Jun. 25, 2019

(54) INFORMATION PROCESSING DEVICE, INFORMATION PROCESSING METHOD, AND PROGRAM

(71) Applicant: SHARP KABUSHIKI KAISHA, Sakai, Osaka (JP)

(72) Inventors: Tomoyuki Kawasoe, Sakai (JP); Yohichiroh Tatsuki, Sakai (JP); Yoshitaka Tanemura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/769,211

(22) PCT Filed: Sep. 29, 2016

(86) PCT No.: PCT/JP2016/078835
§ 371 (c)(1),
(2) Date: Apr. 18, 2018

(87) PCT Pub. No.: WO2017/073234
PCT Pub. Date: May 4, 2017

(65) Prior Publication Data
US 2018/0324582 A1 Nov. 8, 2018

(30) Foreign Application Priority Data
Oct. 30, 2015 (JP) ................................ 2015-214444

(51) Int. Cl.
*H04M 1/00* (2006.01)
*H04W 8/30* (2009.01)
(Continued)

(52) U.S. Cl.
CPC ........... *H04W 8/30* (2013.01); *H04L 63/0853* (2013.01); *H04M 11/00* (2013.01); *H04W 8/183* (2013.01);
(Continued)

(58) Field of Classification Search
USPC .............................. 455/558, 412.2, 415, 413
See application file for complete search history.

(56) References Cited

U.S. PATENT DOCUMENTS

2002/0037714 A1  3/2002  Takae et al.
2008/0125095 A1*  5/2008  Mornhineway ....... H04M 1/576
                                                              455/412.2
(Continued)

FOREIGN PATENT DOCUMENTS

JP    2002-111888 A    4/2002
JP    2009-531943 A    9/2009
(Continued)

*Primary Examiner* — David Q Nguyen
(74) *Attorney, Agent, or Firm* — ScienBiziP, P.C.

(57) ABSTRACT

An information processing device that is connectable to an electronic apparatus, the information processing device includes: a connection unit that detects connection of the electronic apparatus; a storage unit that stores first identification information or second identification information of the electronic apparatus; and a provision unit that provides any one of the first identification information and the second identification information according to a request of the electronic apparatus. The provision unit provides the second identification information to the electronic apparatus in a case that the first identification information according to the request has not been stored in the storage unit or in a case that the first identification information is unable to be acquired.

11 Claims, 5 Drawing Sheets

(51) Int. Cl.
*H04M 11/00* (2006.01)
*H04L 29/06* (2006.01)
*H04W 8/18* (2009.01)
*H04W 8/22* (2009.01)
*H04W 8/26* (2009.01)
*H04W 8/00* (2009.01)
*H04W 88/02* (2009.01)

(52) U.S. Cl.
CPC .............. *H04W 8/22* (2013.01); *H04W 8/26* (2013.01); *H04W 8/005* (2013.01); *H04W 88/02* (2013.01)

(56) References Cited

U.S. PATENT DOCUMENTS

| | | | |
|---|---|---|---|
| 2012/0178500 A1* | 7/2012 | Hwang | H04W 8/183 455/558 |
| 2015/0281926 A1* | 10/2015 | Liu | H04M 3/42 455/558 |
| 2016/0182737 A1 | 6/2016 | Suzuki et al. | |

FOREIGN PATENT DOCUMENTS

| | | |
|---|---|---|
| WO | 2007/111471 A1 | 10/2007 |
| WO | 2015/016374 A1 | 2/2015 |

\* cited by examiner

| SIM IDENTIFICATION INFORMATION | ACCESSIBILITY |
|---|---|
| AAAA | CAN ACCESS NETWORK WITHOUT LIMITATION |
| BBBB | CAN ACCESS ONLY SIM INFORMATION PROVIDING DEVICE IN NETWORK |
| CCCC | CANNOT ACCESS NETWORK |

INFORMATION PROCESSING DEVICE, INFORMATION PROCESSING METHOD, AND PROGRAM

TECHNICAL FIELD

Some aspects of the present invention relate to an information processing device, an information processing method, and a program.

Priority is claimed on Japanese Patent Application No. 2015-214444, filed Oct. 30, 2015, the content of which is incorporated herein by reference.

BACKGROUND ART

There is an electronic apparatus such as a mobile phone that is connected to another electronic apparatus or a network to perform communication by using an IC card in which identification information such as an ID number for specifying a subscriber has been recorded, such as a subscriber identity module card (SIM).

An example of such an electronic apparatus includes an electronic apparatus in which a changing mail for collectively changing stored content of a built-in memory of a mobile phone and a storage medium detachable from the mobile phone is transmitted from a remote control center to a mobile phone, and the mobile phone that has received the changing mail collectively updates the stored content of the built-in memory and the storage medium (for example, Patent Document 1).

PRIOR ART DOCUMENT

Patent Document

[Patent Document 1] Japanese Unexamined Patent Application, First Publication No. 2002-111888

SUMMARY OF INVENTION

Problem to Be Solved by Invention

In the technology described in Patent Document 1, it is assumed that a mobile phone can communicate with a remote control center. However, in the technology described in Patent Document 1, a mobile phone connected to a SIM card that cannot be connected to a network due to termination of a contract or the like, a SIM card that does not store identification information necessary for connection to a network, or the like cannot acquire identification information from the SIM card and update content of the SIM card.

Thus, stored content of the storage medium connected to the electronic apparatus cannot be changed or updated in some cases.

Some aspects of the present invention have been made in view of the above circumstances, and an object thereof is to provide an information processing device, an information processing method, and a program capable of changing and updating stored content of a storage medium connected to an electronic apparatus.

Means for Solving the Problems

The first aspect of the present invention is made in view of the above-described object, and is an information processing device that is connectable to an electronic apparatus, the information processing device including: a connection unit that detects connection of the electronic apparatus; a storage unit that stores first identification information or second identification information of the electronic apparatus; and a provision unit that provides any one of the first identification information and the second identification information according to a request of the electronic apparatus, wherein the provision unit provides the second identification information to the electronic apparatus in a case that the first identification information according to the request has not been stored in the storage unit or in a case that the first identification information is unable to be acquired.

The second aspect of the present invention is made in view of the above-described object, and is an information processing device that is connectable to an electronic apparatus, the information processing device including: a connection unit that detects connection of the electronic apparatus; an acquisition unit that acquires first identification information or second identification information of the electronic apparatus; and a provision unit that provides any one of the first identification information and the second identification information of the electronic apparatus according to a request of the electronic apparatus, wherein the provision unit provides the second identification information to the electronic apparatus in a case that the first identification information according to the request has not been acquired or in a case that the first identification information is unable to be acquired.

The third aspect of the present invention is made in view of the above-described object, and is an information processing method of an information processing device including a storage unit that stores first identification information or second identification information, the information processing device being connectable to an electronic apparatus, the information processing method including: a connection step of detecting connection of the electronic apparatus; and a providing step of providing any one of the first identification information and the second identification information according to a request of the electronic apparatus, wherein the providing step includes providing the second identification information to the electronic apparatus in a case that the first identification information according to the request has not been stored in the storage unit or in a case that the first identification information is unable to be acquired.

The fourth aspect of the present invention is made in view of the above-described object, and is an information processing method of an information processing device that is connectable to an electronic apparatus, the information processing method including: a connection step of detecting connection of the electronic apparatus; an acquisition step of acquiring first identification information or second identification information of the electronic apparatus; and a providing step of providing any one of the first identification information and the second identification information according to a request of the electronic apparatus, wherein the providing step includes providing the second identification information to the electronic apparatus in a case that the first identification information according to the request has not been acquired or in a case that the first identification information is unable to be acquired.

The fifth aspect of the present invention is made in view of the above-described object, and is a computer of an information processing device including a storage unit that stores first identification information or second identification information, the information processing device being connectable to an electronic apparatus, the computer executing: a connection step of detecting connection of the electronic apparatus; and a providing step of providing any one of the first identification information and the second identification information according to a request of the electronic apparatus, wherein the providing step includes providing the second identification information to the electronic apparatus in a case that the first identification information according to the request has not been stored in the storage unit or in a case that the first identification information is unable to be acquired.

The sixth aspect of the present invention is made in view of the above-described object, and is a computer of an information processing device that is connectable to an electronic apparatus, the computer executing: a connection step of detecting connection of the electronic apparatus; an acquisition step of acquiring first identification information or second identification information of the electronic apparatus; and a providing step of providing any one of the first identification information and the second identification information according to a request of the electronic apparatus, wherein the providing step includes providing the second identification information to the electronic apparatus in a case that the first identification information according to the request has not been acquired or in a case that the first identification information is unable to be acquired.

Effect of Invention

According to some aspects of the present invention, it is possible to change or update stored content of a storage medium connected to an electronic apparatus.

EMBODIMENTS FOR CARRYING OUT INVENTION

Hereinafter, embodiments of the present invention will be described in detail with reference to the drawings.

First Embodiment

First, a first embodiment of the present invention will be described.

Figure 1:
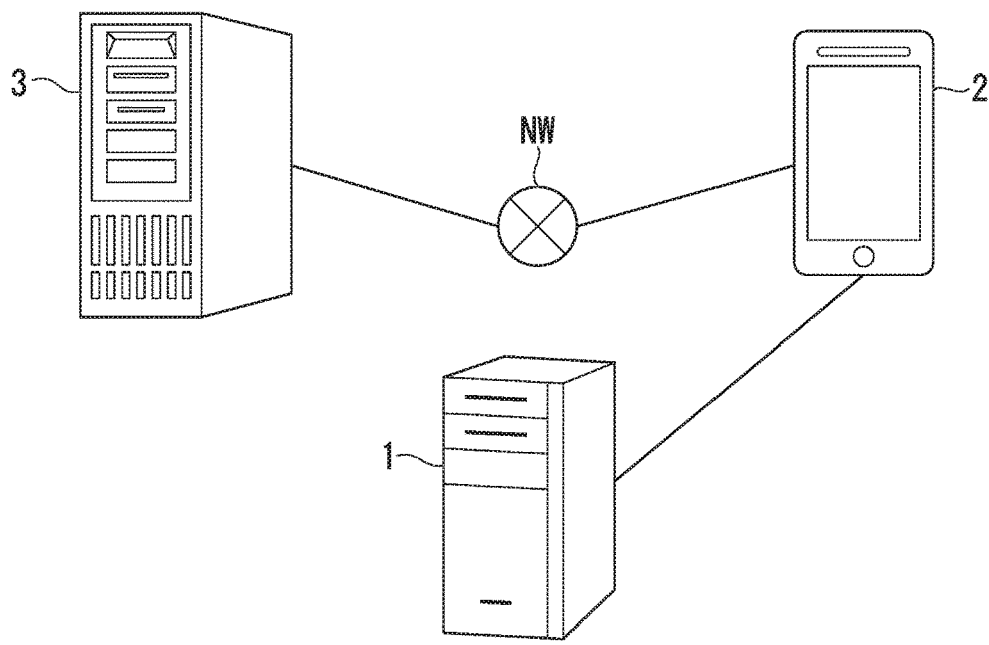
FIG. 1 is a schematic diagram illustrating an example of a configuration of a communication system according to a first embodiment of the present invention.

FIG. 1 is a schematic diagram illustrating an example of a configuration of a communication system S1 according to the first embodiment of the present invention.

The communication system S1 is configured to include a SIM switching device 1, an electronic apparatus 2, and a SIM information providing device 3. The SIM switching device 1 and the electronic apparatus 2 are connected to each other by wire and perform communication. Further, the electronic apparatus 2 and the SIM information providing device 3 are connected to each other by wire or wirelessly over a network NW and perform communication. Here, the electronic apparatus 2 is an electronic apparatus capable of communicating with the outside by connecting to a storage medium in which identification information of a SIM card of a multifunctional electronic apparatus such as a tablet PC or a smartphone, a mobile phone, or the like is stored. In the following description, for example, a case in which the electronic apparatus 2 is a smartphone will be described.

The SIM switching device 1 stores SIM identification information for connection to the network. Note that the SIM switching device 1 may store a plurality of pieces of SIM identification information to identify a plurality of SIM cards. Further, the SIM switching device 1 stores dummy identification information which is dummy SIM identification information. When the SIM switching device 1 receives an identification information acquisition request from the electronic apparatus 2, the SIM switching device 1 provides the SIM identification information or the dummy SIM identification information according to the identification information acquisition request to the electronic apparatus 2.

The SIM switching device 1 is connected to the electronic apparatus 2 by wire. For example, the SIM switching device 1 is connected to the electronic apparatus 2 by causing a connection unit (for example, an adapter) for connection to the electronic apparatus 2 to come in contact with a SIM card slot (SIM card mounting unit (not illustrated)) of the electronic apparatus 2. Note that the SIM switching device 1 may be connected to the electronic apparatus 2 by being mounted on the SIM card slot of the electronic apparatus 2 in the same shape as the SIM card.

The electronic apparatus 2 connects to the network NW using the SIM identification information acquired from the SIM switching device 1 and performs communication. Further, the electronic apparatus 2 connects to the network NW using the dummy SIM identification information acquired from the SIM switching device 1, and acquires the SIM identification information from the SIM information providing device 3. The electronic apparatus 2 connects to the network NW using the SIM identification information acquired from the SIM information providing device 3 and performs communication.

The SIM information providing device 3 stores the SIM identification information according to the dummy SIM identification information.

Further, the SIM information providing device 3 provides the SIM identification information according to the dummy SIM identification information. Specifically, when the connection of the electronic apparatus 2 using the dummy SIM identification information has been detected, the SIM information providing device 3 provides the SIM identification information to the electronic apparatus 2.

Figure 2:
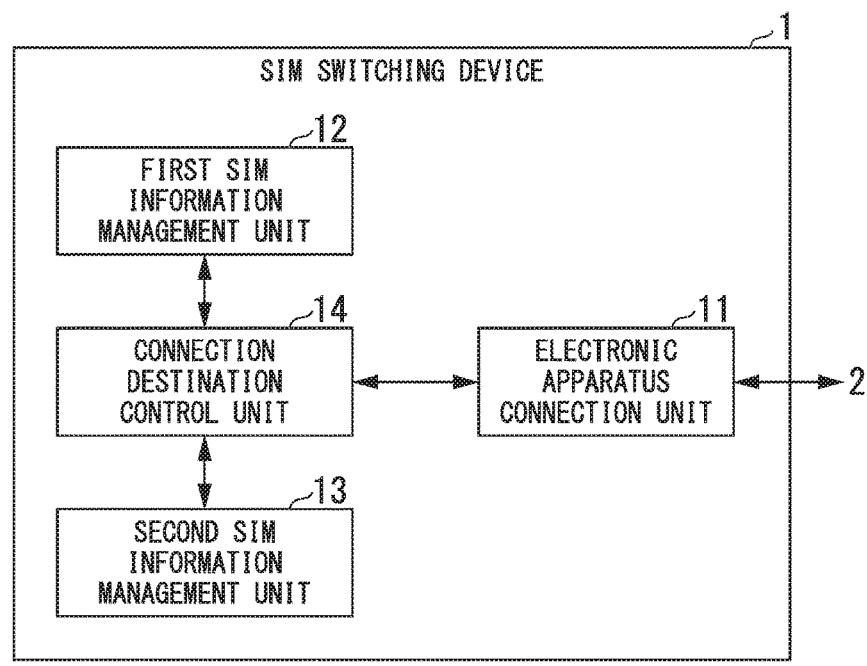
FIG. 2 is a schematic block diagram illustrating an example of a functional configuration of a SIM switching device according to the first embodiment of the present invention.

FIG. 2 is a schematic block diagram illustrating an example of a functional configuration of the SIM switching device 1 according to the first embodiment of the present invention.

The SIM switching device 1 includes an electronic apparatus connection unit 11, a first SIM information management unit 12, a second SIM information management unit 13, and a connection destination control unit 14.

The electronic apparatus connection unit 11 includes an interface capable of wired connection with the electronic apparatus 2, and detects connection of the electronic apparatus 2 to the interface. Further, when the electronic apparatus connection unit 11 detects that the electronic apparatus 2 is connected, the electronic apparatus connection unit 11 receives the identification information acquisition request from the electronic apparatus 2.

The electronic apparatus connection unit 11 outputs the identification information acquisition request received from the electronic apparatus 2 to the connection destination control unit 14. The electronic apparatus connection unit 11 provides the SIM identification information or the dummy SIM identification information input from the connection destination control unit 14 to the electronic apparatus 2 as identification information according to the identification information acquisition request.

The first SIM information management unit 12 stores the SIM identification information. Note that the first SIM information management unit 12 may store a plurality of pieces of SIM identification information.

The second SIM information management unit 13 stores dummy SIM identification information.

Here, the dummy SIM identification information is SIM identification information used for the electronic apparatus 2 to connect to the SIM information providing device 3 over the network NW. Even when this dummy SIM identification information is used, the electronic apparatus 2 cannot connect to a device other than the SIM information providing device 3. That is, the dummy SIM identification information is SIM identification information for connection to the SIM information providing device 3.

When the identification information acquisition request is input from the electronic apparatus connection unit 11, the connection destination control unit 14 confirms whether or not the SIM identification information according to the identification information acquisition request is stored in the first SIM information management unit 12. When the first SIM information management unit 12 stores the SIM identification information according to the identification information acquisition request, the connection destination control unit 14 acquires the SIM identification information according to the identification information acquisition request. The connection destination control unit 14 provides the acquired SIM identification information according to the identification information acquisition request to the electronic apparatus 2 via the electronic apparatus connection unit 11.

On the other hand, when the connection destination control unit 14 determines that the SIM identification information according to the identification information acquisition request is not stored in the first SIM information management unit 12, the connection destination control unit 14 acquires dummy SIM identification information stored in the second SIM information management unit 13 using the identification information acquisition request. The connection destination control unit 14 provides the acquired dummy SIM identification information according to the identification information acquisition request to the electronic apparatus 2 via the electronic apparatus connection unit 11.

Here, the SIM identification information according to the first embodiment will be described.

The SIM identification information includes identification information, such as an International Mobile Subscriber Identifier (IMSI: an identification number assigned to all users of the electronic apparatus 2), an IC card identifier (ICCID: an identification number unique to each IC card), or a telephone number corresponding to the IMSI.

The SIM identification information also includes, for example, information for determining whether or not the electronic apparatus 2 can correctly acquire the SIM identification information.

Next, the dummy SIM identification information according to the first embodiment will be described.

The SIM identification information includes connection limitation information. The connection limitation information includes any one of information indicating that the network NW can be accessed without limitation, information indicating that only the SIM information providing device 3 in the network NW can be accessed, and information indicating that the network NW cannot be accessed.

Figures 3, 4:
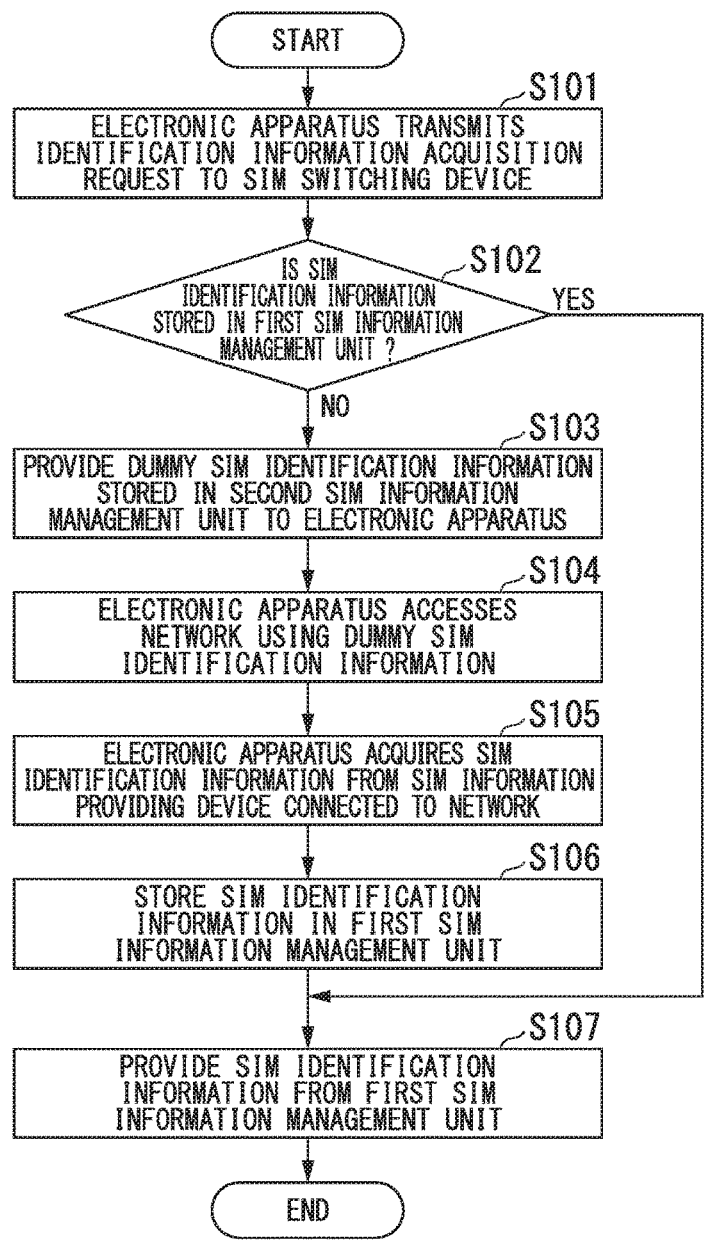
FIG. 3 is an illustrative diagram illustrating an example of SIM identification information according to the first embodiment of the present invention.
FIG. 4 is a flowchart illustrating an example of a process according to the first embodiment of the present invention.

FIG. 3 is an illustrative diagram illustrating an example of the SIM identification information according to the first embodiment of the present invention.

For example, when the SIM identification information is "AAAA," the electronic apparatus 2 using the SIM identification information can access the network NW without limitation and can communicate with a device or the like connected to the network NW.

Further, for example, when the SIM identification information is "BBBB," the electronic apparatus 2 using the SIM identification information can access only the SIM information providing device 3 in the network NW, and can communicate with the SIM information providing device 3.

Further, for example, when the SIM identification information is "CCCC," the electronic apparatus 2 using the SIM identification information cannot access the network NW, the connection to the network NW is rejected, and the electronic apparatus 2 cannot perform communication with a device or the like connected to the network NW.

When the SIM identification information is "BBBB," and when the electronic apparatus 2 using the SIM identification information attempts to access a device other than the SIM information providing device 3, the connection to the network NW is rejected.

Thus, in the network NW, the SIM information of the electronic apparatus 2 using the SIM identification information is confirmed, and a determination as to whether or not the electronic apparatus 2 satisfies connection conditions such as a contract state with an operator of the network NW is performed, and when the connection conditions are satisfied, the connection of the electronic apparatus 2 to the network NW is permitted.

A case in which the SIM identification information allowing the electronic apparatus 2 to access only the SIM information providing device 3 in the network NW, as in a case in which the SIM identification information of the dummy identification information is "BBBB," will be described in the first embodiment.

FIG. 4 is a flowchart illustrating an example of a process of the communication system S1 according to the first embodiment of the present invention.

In step S101, the electronic apparatus 2 transmits an identification information acquisition request to the SIM switching device 1. The electronic apparatus connection unit 11 of the SIM switching device 1 outputs the identification information acquisition request received from the electronic apparatus 2 to the connection destination control unit 14.

In step S102, the connection destination control unit 14 of the SIM switching device 1 confirms whether or not the SIM identification information corresponding to the identification information acquisition request is stored in the first SIM information management unit 12.

When the connection destination control unit 14 determines that the SIM identification information according to the identification information acquisition request is not stored in the first SIM information management unit 12 (step S102; NO), the connection destination control unit 14 performs the process of step S103.

In step S103, the connection destination control unit 14 transmits (provides) the dummy SIM identification information stored in the second SIM information management unit to the electronic apparatus 2 via the electronic apparatus connection unit 11.

In step S104, the electronic apparatus 2 connects to the network NW using the dummy SIM identification information transmitted (provided) from the SIM switching device 1. Further, the electronic apparatus 2 connects to the SIM information providing device 3 (connected to the network NW) in the network NW to which the connection is permitted with the dummy SIM identification information.

In step S105, the electronic apparatus 2 acquires the SIM identification information from the SIM information providing device 3 using the dummy SIM identification information.

In step S106, the electronic apparatus 2 outputs the SIM information acquired from the SIM information providing device 3 to the connection destination control unit 14 via the electronic apparatus connection unit 11 of the SIM switching device 1.

The connection destination control unit 14 updates the SIM identification information by causing the first SIM information management unit 12 to store the SIM identification information input from the electronic apparatus 2 via the electronic apparatus connection unit 11.

In step S107, when the connection destination control unit 14 determines that the SIM identification information according to the identification information acquisition request is stored in the first SIM information management unit 12 (step S102; YES) or after the process in step S106 is performed, the connection destination control unit 14 transmits the SIM identification information stored in the first SIM information management unit 12 to the electronic apparatus 2 via the electronic apparatus connection unit 11.

Thus, the SIM switching device 1 in the first embodiment is a SIM switching device 1 that can be connected to the electronic apparatus 2, and includes the electronic apparatus connection unit 11 that detects the connection of the electronic apparatus 2, the storage unit (the first SIM information management unit 12 or the second SIM information management unit 13) that stores the first SIM identification information or the second SIM identification information (the dummy SIM identification information) of the electronic apparatus 2, and the connection destination control unit 14 that provides any one of the first SIM identification information and the second SIM identification information (the dummy SIM identification information) according to the request of the electronic apparatus 2. When the first identification information according to the request is not stored in the storage unit (the first SIM information management unit 12 or the second SIM information management unit 13) or when the first identification information cannot be acquired, the connection destination control unit 14 provides the second identification information to the electronic apparatus 2.

By doing this, it is possible to appropriately change and update stored content of the storage medium connected to the electronic apparatus. Specifically, even when a SIM card having SIM identification information has not been acquired in advance, the SIM identification information can be updated. Therefore, convenience for the user can be improved.

Second Embodiment

In the first embodiment, an example in which the first SIM information management unit 12 or the second SIM information management unit 13 is included inside the SIM switching device 1, for example, has been described. In the second embodiment, a case in which the SIM information management unit such as the first SIM information management unit or the second SIM information management unit is included outside the SIM switching device will be described.

Figure 5:
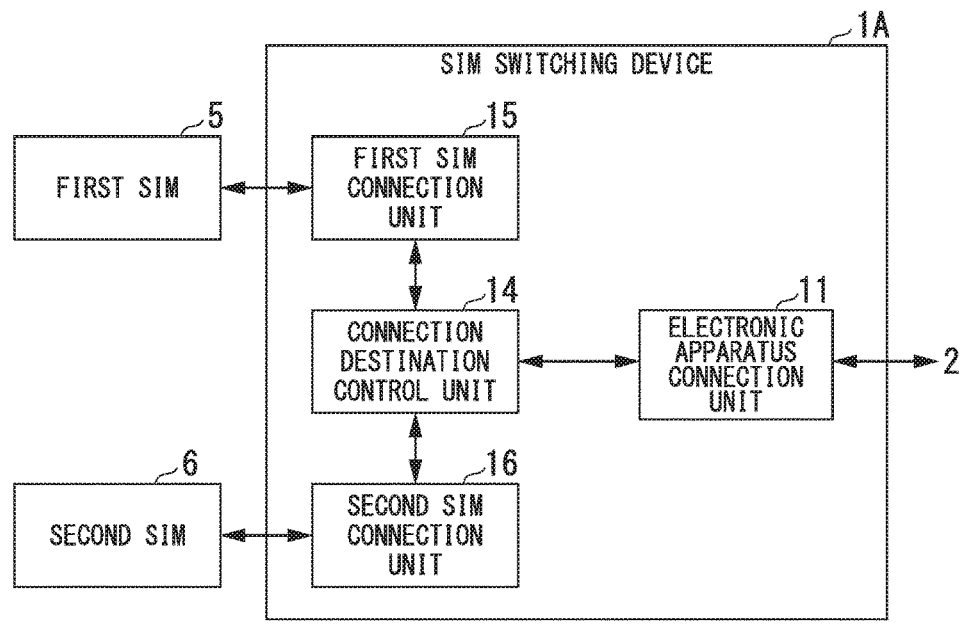
FIG. 5 is a schematic block diagram illustrating an example of a functional configuration of a SIM switching device according to a second embodiment of the present invention.

FIG. 5 is a schematic block diagram illustrating an example of a functional configuration of the SIM switching device 1A according to the second embodiment of the present invention.

The SIM switching device 1A includes an electronic apparatus connection unit 11, a connection destination control unit 14, a first SIM connection unit 15, and a second SIM connection unit 16. In the first embodiment and the second embodiment, the same units are denoted with the same reference numerals and description thereof will be omitted. Differences between the first embodiment and the second embodiment will be mainly described.

The first SIM connection unit 15 is an interface for communicating with the first SIM 5.

The second SIM connection unit 16 is an interface for communicating with the second SIM 6.

Here, the first SIM 5 is a storage medium that stores SIM identification information in a writable manner.

Further, the second SIM 6 is a storage medium that is used at the time of updating the SIM identification information, and is a storage medium that stores dummy SIM identification information for updating the SIM identification information.

When an identification information acquisition request is input from the electronic apparatus connection unit 11, the connection destination control unit 14 confirms whether or not the SIM identification information according to the identification information acquisition request is stored in the first SIM 5 via the first SIM connection unit 15. When the first SIM 5 stores the SIM identification information according to the identification information acquisition request, the connection destination control unit 14 acquires the SIM identification information according to the identification information acquisition request. The connection destination control unit 14 provides the acquired SIM identification information according to the identification information acquisition request to the electronic apparatus 2 via the electronic apparatus connection unit 11.

On the other hand, when the connection destination control unit 14 determines that the SIM identification information according to the identification information acquisition request is not stored in the first SIM 5, the connection destination control unit 14 acquires the dummy SIM identification information stored in the second SIM 6 via the second SIM connection unit 16 using the identification information acquisition request. The connection destination control unit 14 provides the acquired dummy SIM identification information according to the identification information acquisition request to the electronic apparatus 2 via the electronic apparatus connection unit 11.

Thus, the SIM switching device 1A in the second embodiment is a SIM switching device 1A that can be connected to the electronic apparatus 2, and includes the electronic apparatus connection unit 11 that detects the connection of the electronic apparatus 2, the acquisition unit (the first SIM connection unit 15 or the second SIM connection unit 16) that acquires the first identification information or the second identification information of the electronic apparatus, and the connection destination control unit 14 that provides any one of the first identification information and the second identification information of the electronic apparatus according to the request of the electronic apparatus 2. When the first identification information according to the request has not been acquired or when the first identification information cannot be acquired, the connection destination control unit 14 provides the second identification information to the electronic apparatus 2.

By doing this, it is possible to appropriately change and update stored content of the storage medium connected to the electronic apparatus. Specifically, even when a SIM card having SIM identification information has not been acquired in advance, the SIM identification information can be updated. Therefore, convenience for the user can be improved.

Although the case in which two SIMs including the first SIM 5 and the second SIM 6 are used has been described in the second embodiment, the present invention may be realized by only one of these or may be realized by using three or more SIMs.

Third Embodiment

In the first embodiment and the second embodiment, examples in a case in which the SIM information providing device 3 is connected to the network NW have been described. In a third embodiment, an example in which the SIM information providing device 3 is not connected to the network NW, and direct communication is performed between the SIM switching device 1B and the SIM information providing device 3 will be described.

Figure 6:
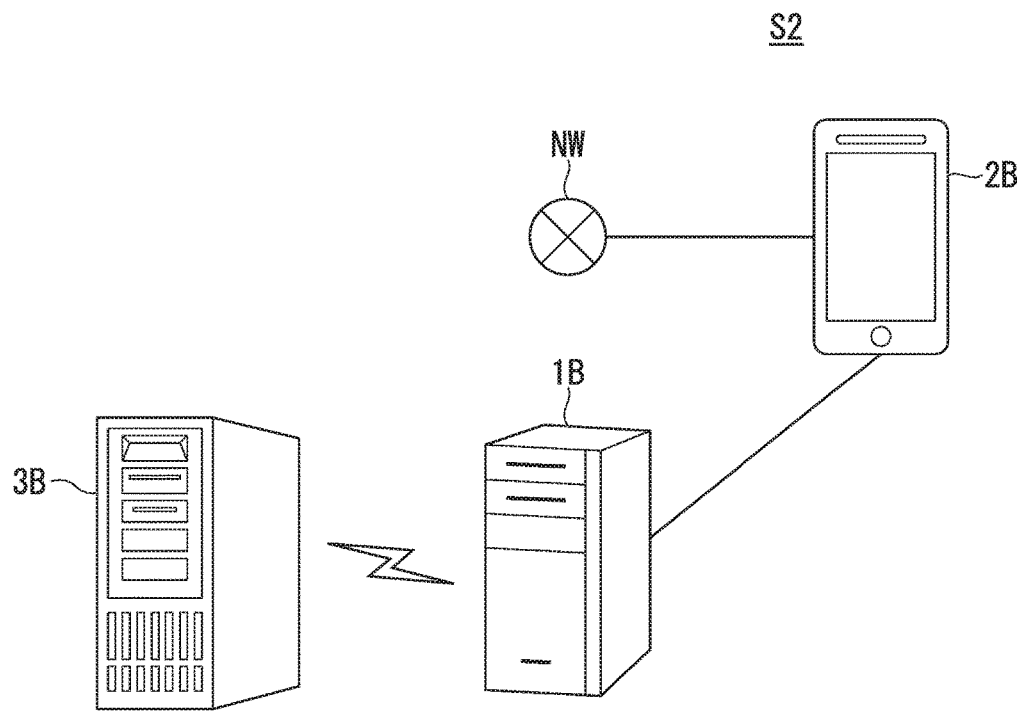
FIG. 6 is a schematic diagram illustrating an example of a configuration of a communication system according to a third embodiment of the present invention.

FIG. 6 is a schematic diagram illustrating an example of a configuration of the communication system S2 according to the third embodiment of the present invention.

The communication system S2 includes a SIM switching device 1B, an electronic apparatus 2B, and a SIM information providing device 3B. The SIM switching device 1B and the electronic apparatus 2B are connected to each other by wire and perform communication. Further, the electronic apparatus 2B is connected by wire or wirelessly over the network NW and performs communication with another device connected to the network.

The SIM switching device 1B stores SIM identification information for connection to the network. Note that the SIM switching device 1B may store a plurality of pieces of SIM identification information to identify a plurality of SIM cards. Further, the SIM switching device 1B stores dummy identification information which is dummy SIM identification information. When the identification information acquisition request is received from the electronic apparatus 2B, the SIM switching device 1B provides SIM identification information and dummy SIM identification information according to the identification information acquisition request to the electronic apparatus 2B.

Here, it is assumed that with the dummy SIM identification information according to the third embodiment, access to the network NW cannot be performed and communication over the network NW cannot be performed.

The electronic apparatus 2B connects to the network NW using the SIM identification information acquired from the SIM switching device 1B, and performs communication. Even when the electronic apparatus 2B tries to connect to the network NW using the dummy SIM identification information acquired from the SIM switching device 1B, the electronic apparatus 2B cannot access the network NW. That is, the electronic apparatus 2B connects to the network NW using the SIM identification information acquired from the SIM information providing device 3B via the SIM switching device 1B, and performs communication.

The SIM information providing device 3B performs near field communication with the SIM switching device 1B. For the near field communication, for example, Near Field Radio Communication (NFC; registered trademark), Bluetooth (registered trademark), or the like may be used.

Further, the SIM information providing device 3B stores the SIM identification information according to the dummy SIM identification information. Further, when the identification information acquisition request is received from the SIM switching device 1B, the SIM information providing device 3B provides the SIM identification information. More specifically, when the identification information acquisition request is received from the SIM switching device 1B, the SIM information providing device 3B provides the SIM identification information for the electronic apparatus 2B to the SIM switching device 1B.

Figure 7:
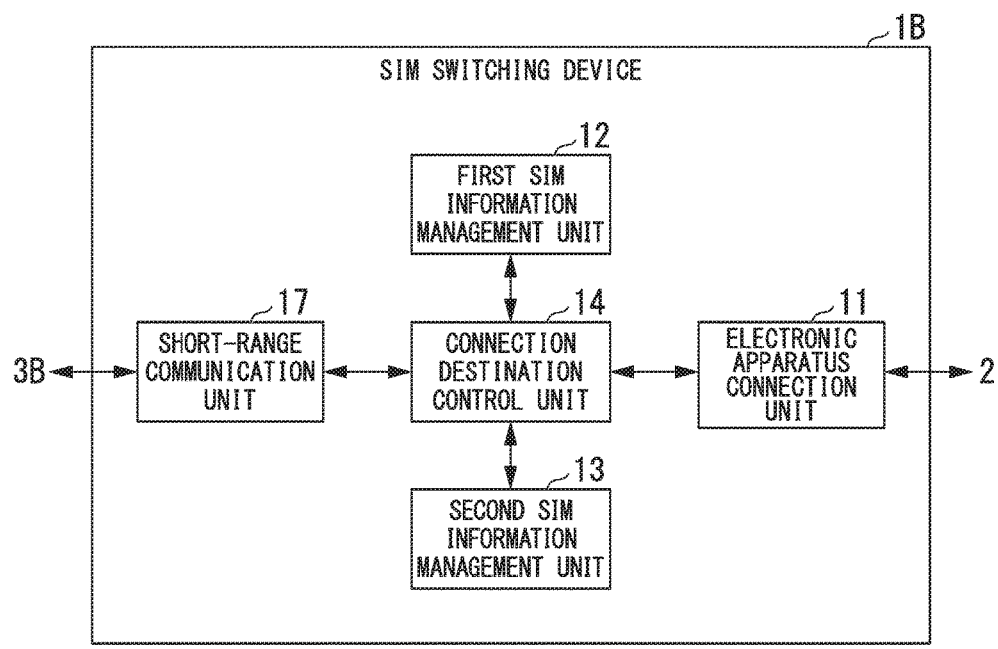
FIG. 7 is a schematic block diagram illustrating an example of a functional configuration of a SIM switching device according to the third embodiment of the present invention.

FIG. 7 is a schematic block diagram illustrating an example of a functional configuration of the SIM switching device 1B according to the third embodiment of the present invention.

The SIM switching device 1B is configured to include an electronic apparatus connection unit 11, a first SIM information management unit 12, a second SIM information management unit 13, a connection destination control unit 14, and a short-range communication unit 17. In the first embodiment and the third embodiment, the same units are denoted with the same reference numerals and description thereof will be omitted. Differences between the first embodiment and the third embodiment will be mainly described.

When the identification information acquisition request is input from the electronic apparatus connection unit 11, the connection destination control unit 14 confirms whether or not the SIM identification information according to the identification information acquisition request is stored in the first SIM information management unit 12. When the first SIM information management unit 12 stores the SIM identification information according to the identification information acquisition request, the connection destination control unit 14 acquires the SIM identification information according to the identification information acquisition request. The connection destination control unit 14 provides the acquired SIM identification information according to the identification information acquisition request to the electronic apparatus 2B via the electronic apparatus connection unit 11.

On the other hand, when the connection destination control unit 14 determines that the SIM identification information according to the identification information acquisition request is not stored in the first SIM information management unit 12, the connection destination control unit 14 acquires dummy SIM identification information stored in the second SIM information management unit 13 using the identification information acquisition request. The connection destination control unit 14 provides the acquired dummy SIM identification information according to the identification information acquisition request to the electronic apparatus 2B via the electronic apparatus connection unit 11.

Further, when the identification information acquisition request is input from the electronic apparatus connection unit 11, the connection destination control unit 14 transmits the identification information acquisition request to the SIM information providing device 3B via the short-range communication unit 17.

Further, when the SIM identification information for the identification information acquisition request is input from the SIM information providing device 3B via the short-range communication unit 17, the connection destination control unit 14 stores the SIM identification information in the first SIM information management unit 12 to update the SIM identification information.

Figure 8:
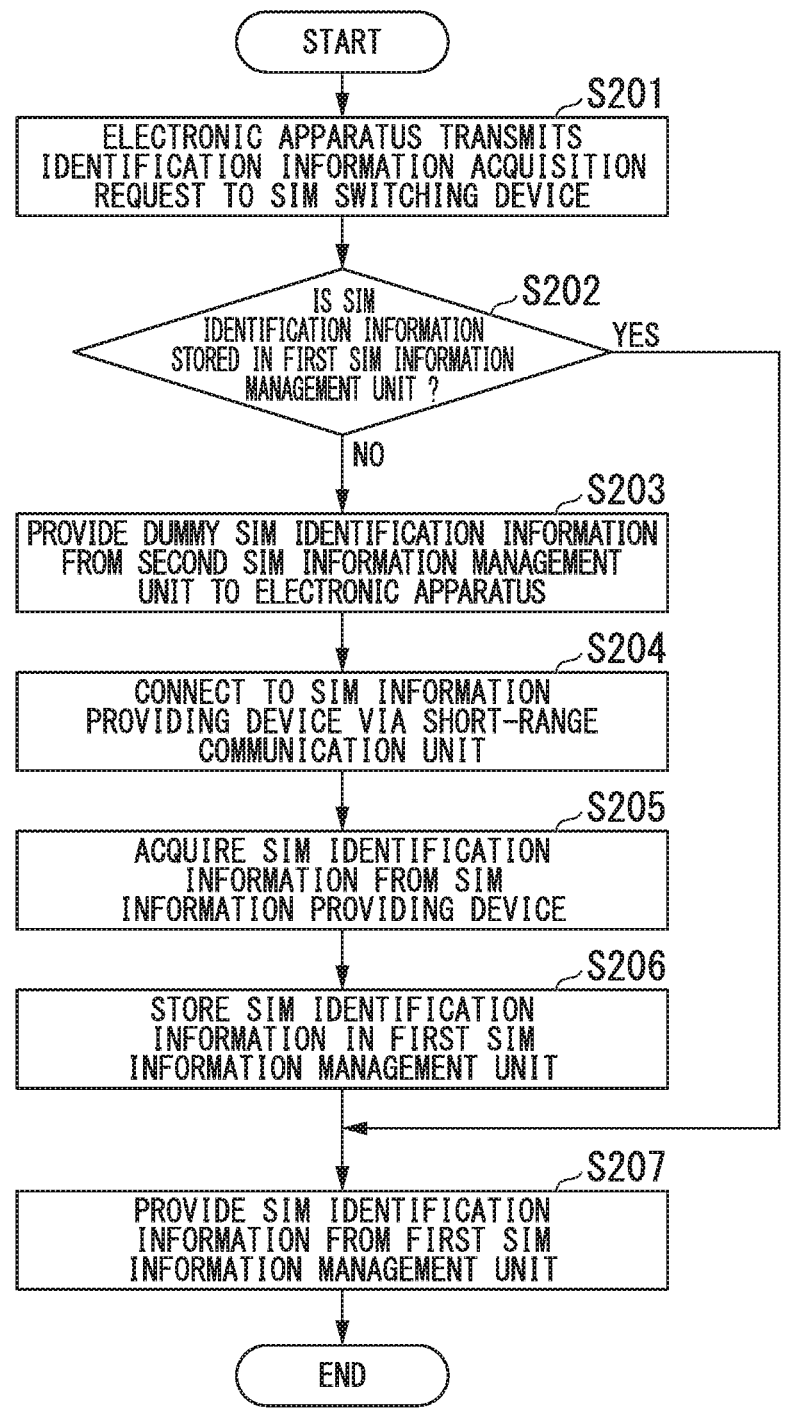
FIG. 8 is a flowchart illustrating an example of a process according to the third embodiment of the present invention.

FIG. 8 is a flowchart illustrating an example of a process of the communication system S2 according to the first embodiment of the present invention.

In step S201, the electronic apparatus 2B transmits an identification information acquisition request to the SIM switching device 1B. The electronic apparatus connection unit 11 of the SIM switching device 1B outputs the identification information acquisition request received from the electronic apparatus 2B to the connection destination control unit 14.

In step S202, the connection destination control unit 14 of the SIM switching device 1B confirms whether the SIM identification information according to the identification information acquisition request is stored in the first SIM information management unit 12.

When the connection destination control unit 14 determines that the SIM identification information according to the identification information acquisition request is not stored in the first SIM information management unit 12 (step S202; NO), the connection destination control unit 14 performs a process of step S203.

In step S203, the connection destination control unit 14 transmits (provides) the dummy SIM identification information stored in the second SIM information management unit to the electronic apparatus 2B via the electronic apparatus connection unit 11.

In step S204, the SIM switching device 1B connects to the SIM information providing device 3B via the short-range communication unit 17.

In step S205, the connection destination control unit 14 of the SIM switching device 1B transmits the identification information acquisition request received from the electronic apparatus 2B to the SIM information providing device 3B via the short-range communication unit 17. The connection destination control unit 14 of the SIM switching device 1B acquires the SIM identification information corresponding to the identification information acquisition request via the short-range communication unit 17.

In step S206, the connection destination control unit 14 stores the SIM information acquired from the SIM information providing device 3 in the first SIM information management unit 12 to update the SIM identification information.

In step S207, when the connection destination control unit 14 determines that the SIM identification information corresponding to the identification information acquisition request is stored in the first SIM information management unit 12 (step S202; YES) or after the process in step S206 is performed, the connection destination control unit 14 transmits the SIM identification information stored in the first SIM information management unit 12 to the electronic apparatus 2B via the electronic apparatus connection unit 11.

Thus, the SIM switching device 1B in the third embodiment is the SIM switching device 1B that is connectable to the electronic apparatus 2B, and includes the electronic apparatus connection unit 11 that detects the connection of the electronic apparatus 2B, the storage unit (the first SIM information management unit 12 or the second SIM information management unit 13) that stores the first SIM identification information or the second SIM identification information (the dummy SIM identification information) of the electronic apparatus 2B, the connection destination control unit 14 that provides any one of the first SIM identification information and the second SIM identification information (dummy SIM identification information) according to the request of the electronic apparatus 2B. When the first identification information according to the request is not stored in the storage unit (the first SIM information management unit 12 or the second SIM information management unit 13) or when the first identification information cannot be acquired, the connection destination control unit 14 provides the second identification information to the electronic apparatus 2B.

By doing this, it is possible to appropriately change and update stored content of the storage medium connected to the electronic apparatus. Specifically, even when a SIM card having SIM identification information has not been acquired in advance, the SIM identification information can be updated. Therefore, convenience of the user can be improved.

Note that the third embodiment and the second embodiment may be realized in combination.

That is, the SIM information management unit such as the first SIM information management unit or the second SIM information management unit in the third embodiment may be included outside the SIM switching device.

In this case, the present invention may be realized by only one of the two SIMs including the first SIM 5 and the second SIM 6 or may be realized by using three or more SIMs.

(1) An information processing device that is connectable to an electronic apparatus, the information processing device including a connection unit that detects connection of the electronic apparatus; a storage unit that stores first identification information or second identification information of the electronic apparatus; and a provision unit that provides any one of the first identification information and the second identification information according to a request of the electronic apparatus, wherein the provision unit provides the second identification information to the electronic apparatus in a case that the first identification information according to the request has not been stored in the storage unit or in a case that the first identification information is unable to be acquired.

(2) An information processing device that is connectable to an electronic apparatus, the information processing device including: a connection unit that detects connection of the electronic apparatus; an acquisition unit that acquires first identification information or second identification information of the electronic apparatus; and a provision unit that provides any one of the first identification information and the second identification information of the electronic apparatus according to a request of the electronic apparatus, wherein the provision unit provides the second identification information to the electronic apparatus in a case that the first identification information according to the request has not been acquired or in a case that the first identification information is unable to be acquired.

(3) The information processing device according to (1) or (2), wherein the provision unit includes an updating unit, and the updating unit updates third identification information that the electronic apparatus has acquired on the basis of the second identification information, as the first identification information.

(4) The information processing device according to (1) or (2), wherein the provision unit includes an updating unit, and the updating unit acquires third identification information from the providing device on the basis of the request and updates the acquired third identification information as the first identification information.

(5) The information processing device according to any one of (1) to (4), wherein the provision unit provides third identification information after providing the second identification information to the electronic apparatus in a case of providing the second identification information to the electronic apparatus, and the electronic apparatus performs communication using at least the third identification information.

(6) An information processing method of an information processing device including a storage unit that stores first identification information or second identification information, the information processing device being connectable to an electronic apparatus, the method including: a connection step of detecting connection of the electronic apparatus; and a providing step of providing any one of the first identification information and the second identification information according to a request of the electronic apparatus, wherein the providing step includes providing the second identification information to the electronic apparatus in a case that the first identification information according to the request has not been stored in the storage unit or in a case that the first identification information is unable to be acquired.

(7) An information processing method of an information processing device that is connectable to an electronic apparatus, the method comprising: a connection step of detecting connection of the electronic apparatus; an acquisition step of acquiring first identification information or second identification information of the electronic apparatus; and a providing step of providing any one of the first identification information and the second identification information according to a request of the electronic apparatus, wherein the providing step includes providing the second identification information to the electronic apparatus in a case that the first identification information according to the request has not been acquired or in a case that the first identification information is unable to be acquired.

(8) A computer of an information processing device including a storage unit that stores first identification information or second identification information, the information processing device being connectable to an electronic apparatus, the computer executing: a connection step of detecting connection of the electronic apparatus; and a providing step of providing any one of the first identification information and the second identification information according to a request of the electronic apparatus, wherein the providing step includes providing the second identification information to the electronic apparatus in a case that the first identification information according to the request has not been stored in the storage unit or in a case that the first identification information is unable to be acquired.

(9) A computer of an information processing device that is connectable to an electronic apparatus, the computer executing: a connection step of detecting connection of the electronic apparatus; an acquisition step of acquiring first identification information or second identification information of the electronic apparatus; and a providing step of providing any one of the first identification information and the second identification information according to a request of the electronic apparatus, wherein the providing step includes providing the second identification information to the electronic apparatus in a case that the first identification information according to the request has not been acquired or in a case that the first identification information is unable to be acquired.

Note that some or all of the SIM switching devices 1, 1A, and 1B in the above-described embodiment, for example, the CPU 101 may be realized, for example, by a computer. In this case, some or all of the SIM switching devices 1, 1A, and 1B may be realized by recording a program for realizing a control function thereof on a computer-readable recording medium, loading the program recorded on the recording medium into a computer system, and executing the program. Here, the "computer system" is a computer system incorporated in the SIM switching device 1, 1A, or 1B and is assumed to include an OS or hardware such as a peripheral device. Further, the "computer-readable recording medium" refers to a portable medium such as a flexible disk, a magneto-optical disc, a ROM, or a CD-ROM, or a storage device such as a hard disk incorporated in the computer system. Further, the "computer-readable recording medium" may also include a recording medium that dynamically holds a program for a short period of time, such as a communication line when the program is transmitted over a network such as the Internet or a communication line such as a telephone line, or a recording medium that holds a program for a certain period of time, such as a volatile memory inside a computer system serving as a server or a client in that case. Further, the above program may be a program for realizing some of the above-described functions. Further, the program may be a program capable of realizing the above-described functions in combination with a program previously recorded in a computer system.

Further, some or all of the SIM switching device 1, 1A, and 1B in the above-described embodiments may be realized as an integrated circuit such as a Large Scale Integration (LSI). The respective functional blocks of the SIM switching device 1, 1A, and 1B may be individually realized as a processor, or some or all thereof may be integrated and realized as a processor. Further, an integrated circuit scheme is not limited to the LSI, and may be realized by a dedicated circuit or a general-purpose processor. Further, when an integrated circuit technology with which the LSI is replaced appears with the advance of a semiconductor technology, an integrated circuit based on the technology may be used.

The respective embodiments of the present invention have been described in detail with reference to the drawings, but specific configurations are not limited to those described above, and various design changes or the like can be made without departing from the gist of the present invention.

Further, although the respective embodiments from the first embodiment to the third embodiment have been described, two or more embodiments may be appropriately combined.

INDUSTRIAL APPLICABILITY

Some aspects of the present invention can be applied to, for example, an information processing device, an information processing method, a program in which it is necessary for stored content of a storage medium connected to an electronic apparatus to be changed and updated.

DESCRIPTION OF REFERENCE SYMBOLS

S1, S2 ... Communication system
1, 1A, 1B ... SIM switching device
2, 2B ... Electronic apparatus
3, 3B ... SIM information providing device
11 ... Electronic apparatus connection unit
12 ... First SIM information management unit
13 ... Second SIM information management unit
14 ... Connection destination control unit
15 ... First SIM connection unit
16 ... Second SIM connection unit
17 ... Short-range communication unit
5 ... First SIM
6 ... Second SIM

The invention claimed is:

1. An information processing device that is connectable to an electronic apparatus, the information processing device comprising:
   a connection unit that detects connection of the electronic apparatus;
   a storage unit that stores first identification information or second identification information of the electronic apparatus; and
   a provision unit that provides any one of the first identification information and the second identification information according to a request of the electronic apparatus,
   wherein the provision unit provides the second identification information to the electronic apparatus in a case that the first identification information according to the request has not been stored in the storage unit or in a case that the first identification information is unable to be acquired, and
   wherein the provision unit provides third identification information after providing the second identification information to the electronic apparatus in a case of providing the second identification information to the electronic apparatus, and the electronic apparatus performs communication using at least the third identification information.

2. The information processing device according to claim 1,
   wherein the provision unit includes an updating unit, and
   the updating unit updates third identification information that the electronic apparatus has acquired based on the second identification information, as the first identification information.

3. The information processing device according to claim 1,
   wherein the provision unit includes an updating unit, and
   the updating unit acquires third identification information from a providing device based on the request and updates the acquired third identification information as the first identification information.

4. The information processing device according to claim 1,
   wherein the connection unit detects wired connection of the electronic apparatus.

5. The information processing device according to claim 1,
   wherein the provision unit provides the electronic apparatus with the first identification information in a case that the first identification information according to the request has been stored in the storage unit or in a case that the first identification information is able to be acquired.

6. The information processing device according to claim 1,
   wherein the second identification information is for the electronic apparatus to only connect to a providing device, and
   the first identification information is different from the second identification information.

7. An information processing device that is connectable to an electronic apparatus, the information processing device comprising:
   a connection unit that detects connection of the electronic apparatus;
   an acquisition unit that acquires first identification information or second identification information of the electronic apparatus; and
   a provision unit that provides any one of the first identification in formation and the second identification information of the electronic apparatus according to a request of the electronic apparatus,
   wherein the provision unit provides the second identification information to the electronic apparatus in a case that the first identification information according to the request has not been acquired or in a case that the first identification information is unable to be acquired, and
   wherein the provision unit provides third identification information after providing the second identification information to the electronic apparatus in a case of providing the second identification information to the electronic apparatus, and the electronic apparatus performs communication using at least the third identification information.

8. An information processing method of an information processing device including a storage unit that stores first identification information or second identification information, the information processing device being connectable to an electronic apparatus, the information processing method comprising:
   detecting connection of the electronic apparatus; and
   providing any one of the first identification information and the second identification information according to a request of the electronic apparatus,
   wherein, during the provision, the second identification information to the electronic apparatus is provided in a case that the first identification information according to the request has not been stored in the storage unit or in a case that the first identification information is unable to be acquired, and
   wherein third identification information is provided after providing the second identification information to the electronic apparatus in a case of providing the second identification information to the electronic apparatus, and the electronic apparatus performs communication using at least the third identification information.

9. An information processing method of an information processing device that is connectable to an electronic apparatus, the information processing method comprising:
   detecting connection of the electronic apparatus;
   acquiring first identification information or second identification information of the electronic apparatus; and
   providing any one of the first identification information and the second identification information according to a request of the electronic apparatus,
   wherein, during the provision, the second identification information to the electronic apparatus is provided in a case that the first identification information according to the request has not been acquired or in a case that the first identification information is unable to be acquired, and wherein third identification information is provided after providing the second identification information to the electronic apparatus in a case of providing the second identification information to the electronic apparatus, and the electronic apparatus performs communication using at least the third identification information.

10. A non-transitory computer-readable recording medium in which a computer program is stored, a computer of an information processing device including a storage unit that stores first identification information or second identification information, the information processing device being connectable to an electronic apparatus, the program making the computer:

detect connection of the electronic apparatus; and provide any one of the first identification information and the second identification information according to a request of the electronic apparatus, wherein, during the provision, the second identification information to the electronic apparatus is provided in a case that the first identification information according to the request has not been stored in the storage unit or in a case that the first identification information is unable to be acquired, and wherein third identification information is provided after providing the second identification information to the electronic apparatus in a case of providing the second identification information to the electronic apparatus, and the electronic apparatus performs communication using at least the third identification information.

11. A non-transitory computer-readable recording medium in which a computer program is stored, a computer of an information processing device that is connectable to an electronic apparatus, the program making the computer:

detect connection of the electronic apparatus;

acquire first identification information or second identification information of the electronic apparatus; and provide any one of the first identification information and the second identification information according to a request of the electronic apparatus, wherein, during the provision, the second identification information to the electronic apparatus is provided in a case that the first identification information according to the request has not been acquired or in a case that the first identification information is unable to be acquired, and wherein third identification information is provided after providing the second identification information to the electronic apparatus in a case of providing the second identification information to the electronic apparatus, and the electronic apparatus performs communication using at least the third identification information.

* * * * *